W. W. Lewis.

Sheet 1, 2 Sheets.

Horse Shoe Mach.

No. 3,354.

Reissued Mar. 30, 1869.

Witnesses;
R. W. Flenwick
Warren Billings

Inventor;
W. W. Lewis

N. PETERS, PHOTO-LITHOGRAPHER, WASHINGTON, D. C.

Sheet 2, 2 Sheets.

W. W. Lewis.

Horse Shoe Mach.

No. 3354 Reissued Mar. 30, 1869

Witnesses;
R. H. Henwick
Warren Billings

Inventor;
W. W. Lewis

N. PETERS, PHOTO-LITHOGRAPHER, WASHINGTON, D. C.

UNITED STATES PATENT OFFICE.

WILLIAM W. LEWIS, OF CINCINNATI, OHIO.

IMPROVED MACHINE FOR ROLLING HORSESHOE-IRON.

Specification forming part of Letters Patent No. 22,812, dated February 1, 1859; Reissue No. 3,354, dated March 30, 1869.

*To all whom it may concern:*

Be it known that I, WILLIAM W. LEWIS, of Cincinnati, Hamilton county, Ohio, have invented certain new and useful Improvements in Machinery for Making Horseshoe-Iron; and I do hereby declare that the following is a full, clear, and exact description of the same, reference being had to the accompanying drawings, forming a part of this specification, in which—

Figure 1:
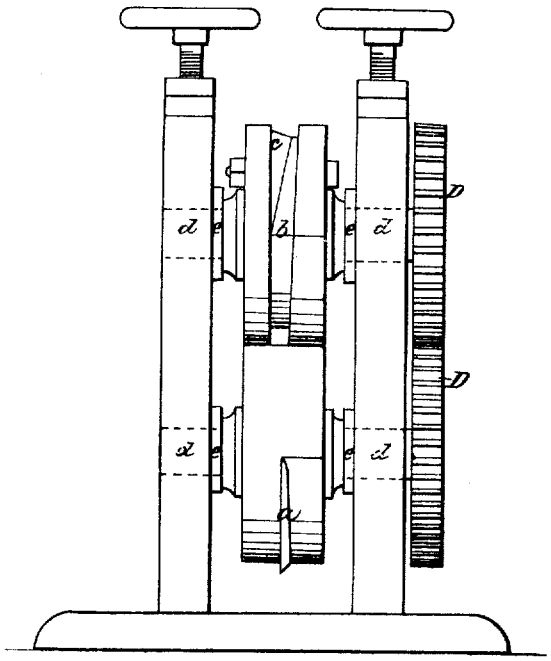
Figure 2:
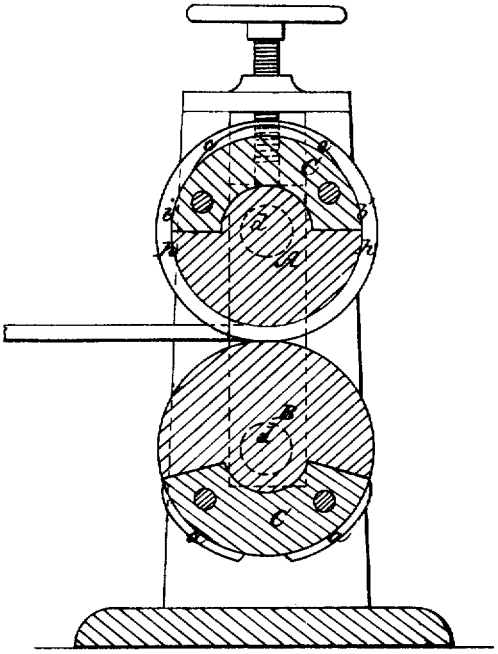
Figure 3:
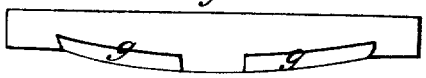
Figure 4:
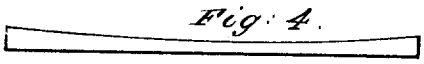
Figure 8:
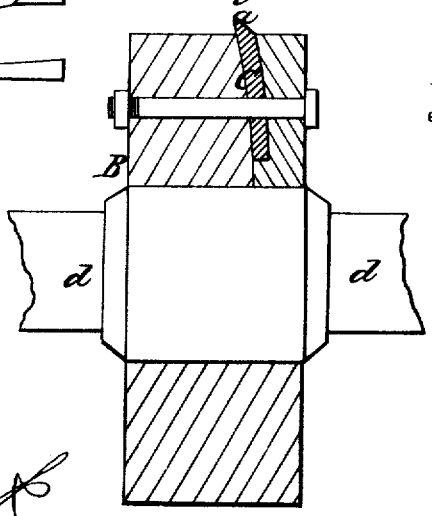
Figure 5:
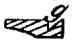
Figure 7:
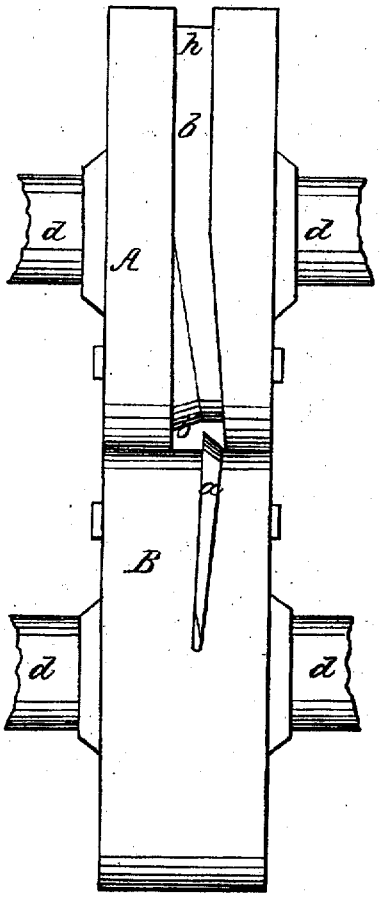
Figure 6:
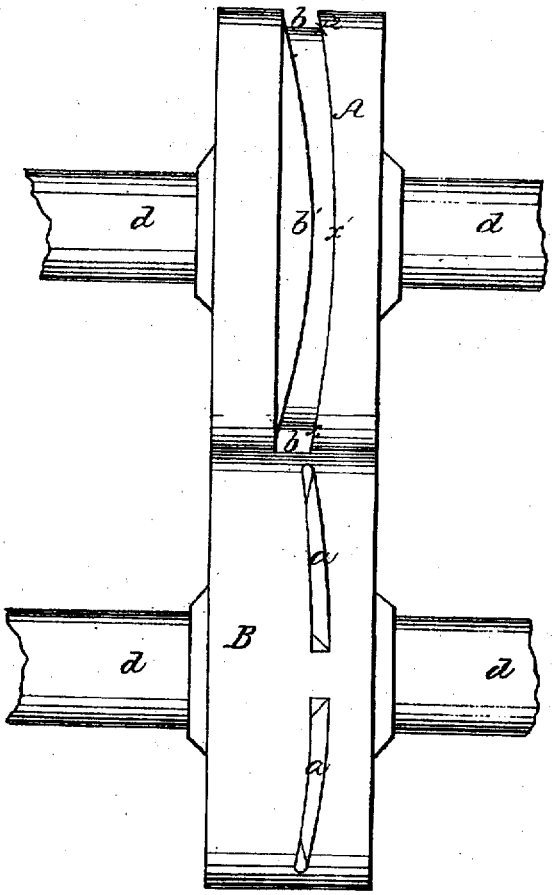

Figures 1, 6, and 7 are front views showing the rollers at different stages of the operation. Figs. 2 and 8 are transverse and longitudinal sections of the same. Fig. 3 is a piece of iron which has passed through the rollers; and Fig. 4 is an edge view, and Fig. 5 a transverse view, of the same.

Prior to my invention horse and ox shoe iron has been produced by machinery consisting of two rollers mounted or dressed with grooves and creasers, or of four rollers properly dressed, for giving configuration to the iron from which the shoes are to be formed; but in these and all prior devices the principle upon which my improvements are founded is overlooked.

When iron is rolled in a plain-grooved roller in which the cross-section of the groove is a parallelogram, and a creaser is applied during the process of rolling, it is evident that the iron displaced by the creaser must be forced against the sides of the groove. To accommodate this expansion some play is allowed between the iron and the sides of the groove; or, in other words, the iron does not fit tightly in the groove; but it is evident that if any play be allowed it becomes necessary to guide the iron in some way, so as to form the depression for the nails or crease in a line that is exactly parallel with the side of the shoe, as a variation from this parallelism would destroy the workmanship of the manufactured article. For the purpose of obviating this difficulty I place an inclined plane in the bottom of the groove opposite the creaser. The effect of this is to press the iron toward the opposite side of the groove, where the creaser operates, and to keep it against that side, which thus serves as a guide to preserve the parallelism. The effect is also to make the outer edge of the iron which contains the crease thicker than the inner edge, which is the natural form of the shoe. I also make the bottom of the groove eccentric, so as to make the shoe thicker at the heel than at the toe, and this will be effected although the bar is of uniform thickness when fed to the rolls, because the iron displaced by the creasers in the shallower portion, being unable to escape because of the lateral pressure against the sides, must be forced toward the ends, where it will occupy the full depth of the groove. I place the creasers in the rolls in the form of a ring where the whole roll is used, or of a semi-ring where but half the circumference is employed. In the latter case I cut the roll radially, so as to remove and replace one side of the roll opposite the creaser. This enables me to remove the creasers when they become worn or imperfect, or to substitute different sizes, as may be desired.

In the example of my invention represented in the drawings the rollers are specially adapted to feeding the bar at intervals to the bending machinery patented by me June 28, 1858, shaping it as they do so, and thus dispensing with the vertically-moving dies in my patented machine above mentioned. The lower roller, B, is perfectly cylindrical, except that it has two separate curved projections, *a a*, which are struck from the same center. These projections I call the "creasers," they serving to produce the creases (see *g g*, Fig. 3,) in the horseshoe-iron. The circumference of the roller B is equal to double the length which the piece which forms the shoe has after it has been rolled, and the creasers *a a* consequently extend nearly half-way round it. The upper roller, A, is cylindrical externally, and contains a groove, *b*, extending all round. The bottom of the groove on one-half of the circumference of the roller is made eccentric, as shown at *b'* in Fig. 2, to roll the piece rather thinner in the middle, and gradually thicker toward the ends, and the said eccentric portions have an inclined bottom, as shown at *c c*, Figs. 1 and 7, to make the outer edge of the shoe thicker than the inner, and also to guide the iron to the side of the grooves where the creasers are operating, and so make true work.

The length of the above-described half of the circumference of the bottom of the groove *b* must be equal to the semicircumference of the roller B. The depth and width of the several portions of this half of the groove are such as to make the shoe of the requisite thickness. The other half of the circumference of the bottom of the groove in this particular form of machine is concentric and deeper, as shown at *h h*, Fig. 1, and wide enough to receive the bar from which the shoes are to be made without gripping it against the roller B.

In the pair of rolls represented, it will be readily understood that only one half of the circumference is operative, the bar not being gripped by the half *b b* of the groove, and consequently not being fed forward. This suspension of the operation is for the purpose of allowing the operation of the bending apparatus (which is not shown) to take place. The bending of one piece is performed while the deep part *h h* of the groove is passing the bar. The pieces, after having been formed as shown in Figs. 3, 4, and 5, may be cut off by a cutter attached to one of the rollers, or otherwise suitably applied.

I will remark that the operative portions of the rollers may occupy less than one-half of the circumference; but they must of course occupy corresponding portions of both rollers.

When the rollers are not to be used in connection with my bending-machine, or are to be employed in rolling the bars into a series of lengths suitable for shoes, the other halves of the rolls are to be formed like the operative portions of the rollers described, both as to the creasers, inclined bottom for the groove, and eccentric. This would make the whole of the groove operative throughout the entire circumference; or the rollers may have circumferences composed of a continuous series of such operative portions in any number, and a bar, after leaving a pair of ordinary rollers, may be run without reheating through a pair of such rollers, and be subsequently cut in pieces, and formed into shoes by bending in any manner.

The creasers *a a* may have attached to them the punches for punching the nail-holes; or the holes may be punched by a subsequent operation.

What I claim as my invention, and desire to secure by Letters Patent, is—

1. The combination, in a pair of rolls, of a groove with an inclined bottom, and one or more creasers, for the purpose of guiding the iron and producing a thicker edge on the outside of the shoe, substantially as described.

2. The combination of a pair of grooved rollers with one or more creasers, when the bottom of the groove or rolling surface of either roll is eccentric, so as to make the shoes thicker at the heels than at the point or toe, substantially as set forth.

3. The combination, with a pair of rolls, of annular adjustable creasers, substantially as described.

WILLIAM W. LEWIS.

Witnesses:
E. G. HALL,
SAML. F. FISHER.